United States Patent [19]

Krone et al.

[11] Patent Number: 4,610,123
[45] Date of Patent: Sep. 9, 1986

[54] APPARATUS FOR COVERING BALES IN BALING PRESSES

[75] Inventors: Bernard Krone, Spelle; Wilhelm Ahler, Stadtlohn, both of Fed. Rep. of Germany

[73] Assignee: Maschinenfabriken Bernard Krone GmbH, Spelle, Fed. Rep. of Germany

[21] Appl. No.: 658,103

[22] Filed: Oct. 5, 1984

[30] Foreign Application Priority Data

Oct. 7, 1983 [DE] Fed. Rep. of Germany ....... 3336554

[51] Int. Cl.$^4$ ............................................ B65B 11/04
[52] U.S. Cl. ....................................... 53/118; 53/211; 53/587; 56/341; 188/187; 242/75.4
[58] Field of Search ................ 53/118, 204, 211, 556, 53/587; 56/341, 2; 242/75.4, 75.43, 75.46; 188/71.1, 72.9, 135, 187

[56] References Cited

U.S. PATENT DOCUMENTS

| 3,488,014 | 1/1970 | Martin | 242/75.46 |
|---|---|---|---|
| 3,715,861 | 2/1973 | Odelberg | 53/211 |
| 3,862,724 | 1/1975 | Johnson et al. | 242/75.43 |
| 3,943,684 | 3/1976 | Lotz | 53/389 |
| 4,151,900 | 5/1979 | Kirwan | 242/75.46 |
| 4,173,112 | 11/1979 | Meiners | 53/118 |
| 4,407,113 | 10/1983 | Core | 53/587 |
| 4,409,784 | 10/1983 | Van Ginhoven et al. | 53/211 |

FOREIGN PATENT DOCUMENTS 3322024 8/1984 Fed. Rep. of Germany .

Primary Examiner—John Sipos
Assistant Examiner—Donald R. Studebaker
Attorney, Agent, or Firm—Jordan and Hamburg

[57] ABSTRACT

An attachable apparatus for covering round bales of agricultural harvested goods with a section of a covering inside a molding chamber of a baling press includes a supply roll freely rotatable about a tranversal axis and having an adjustable braking force. The supply roll extends across the width of a housing parallel to the center axis of the press chamber. A pull-off device which initiates the starting phase of the covering process is located adjacent the opening where the goods to be harvested enter or a comparable slit is located in the housing of the press chamber. During the starting phase, the braking effect of the supply roll is considerably reduced or suspended.

17 Claims, 6 Drawing Figures

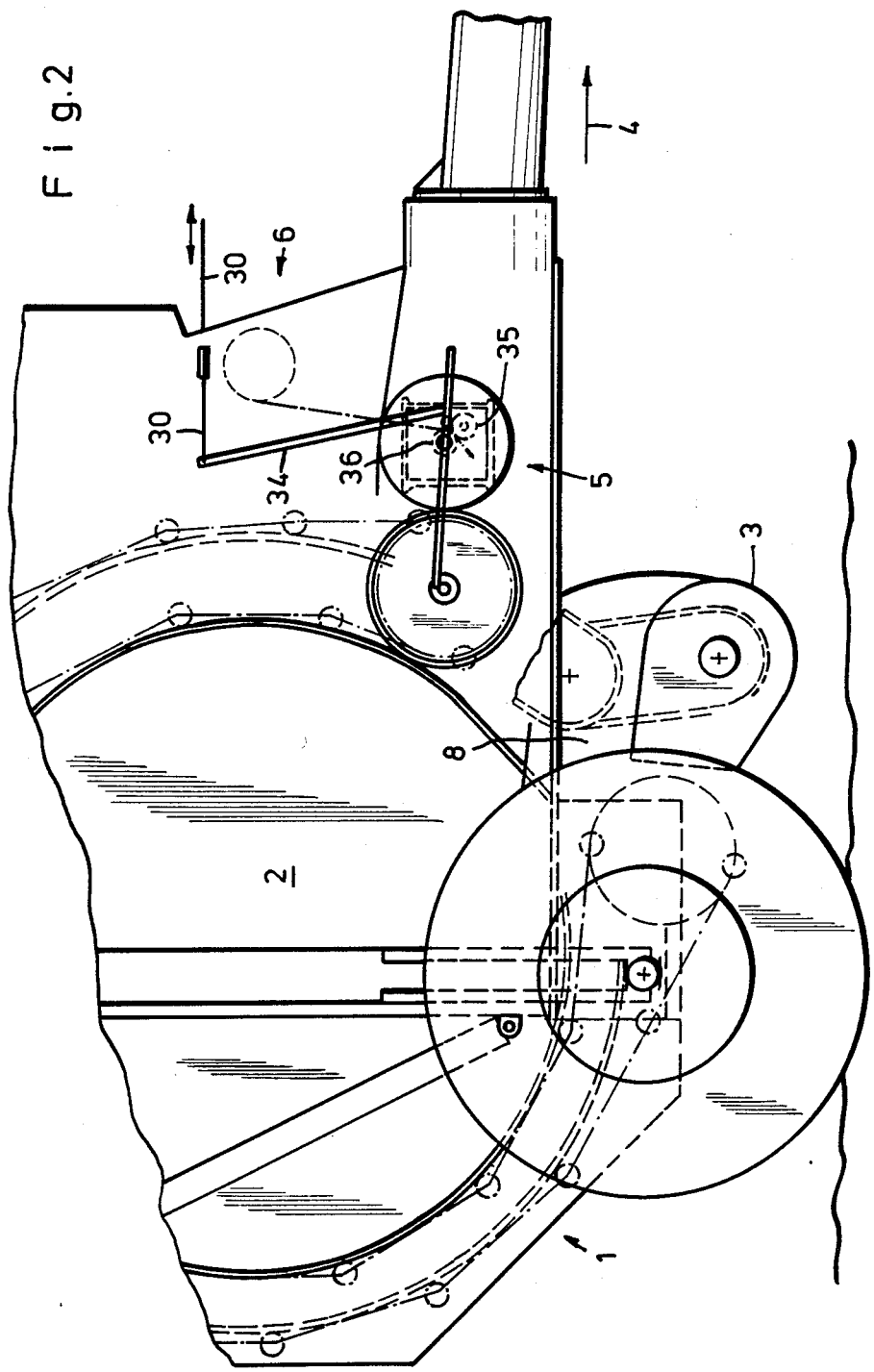

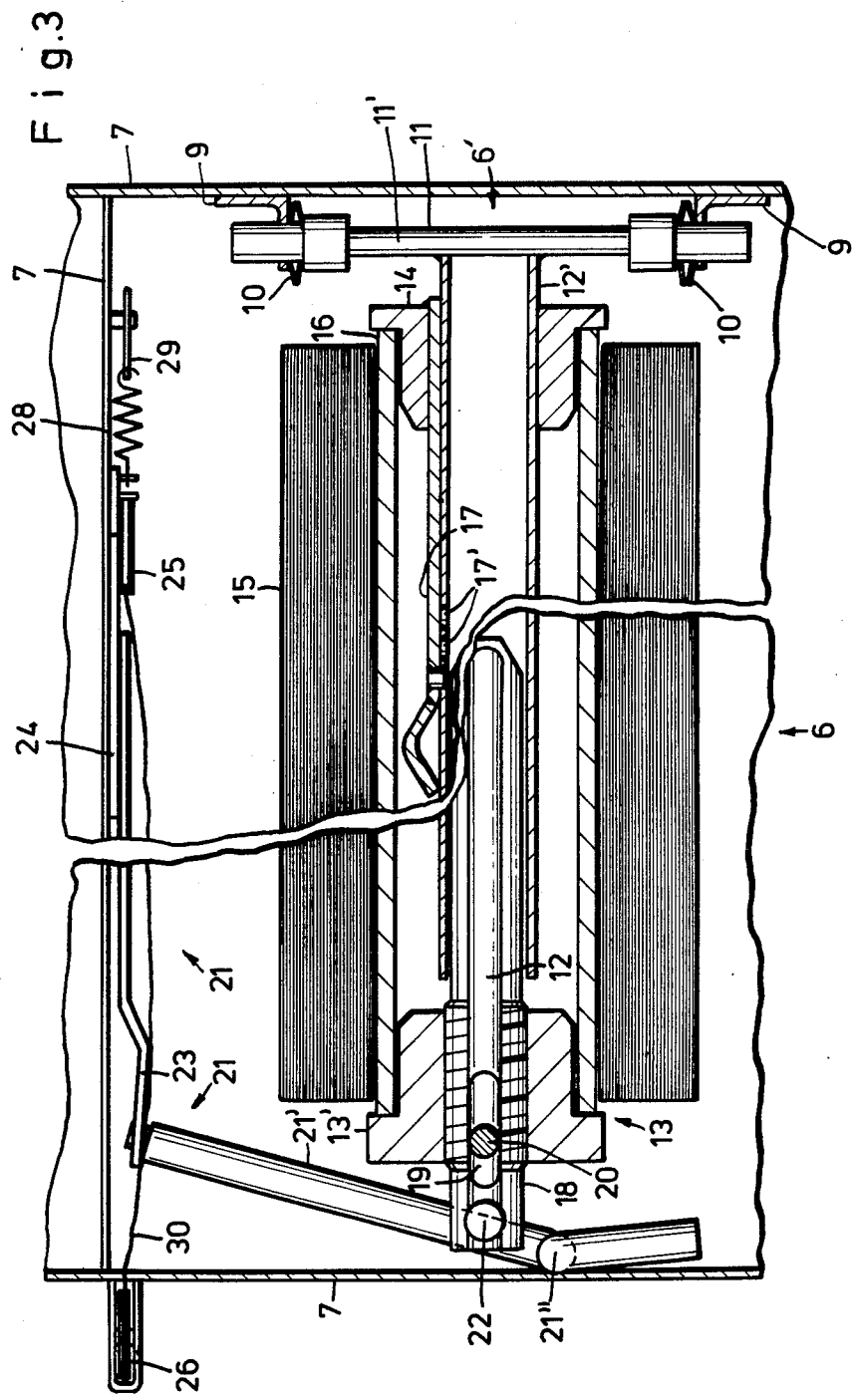

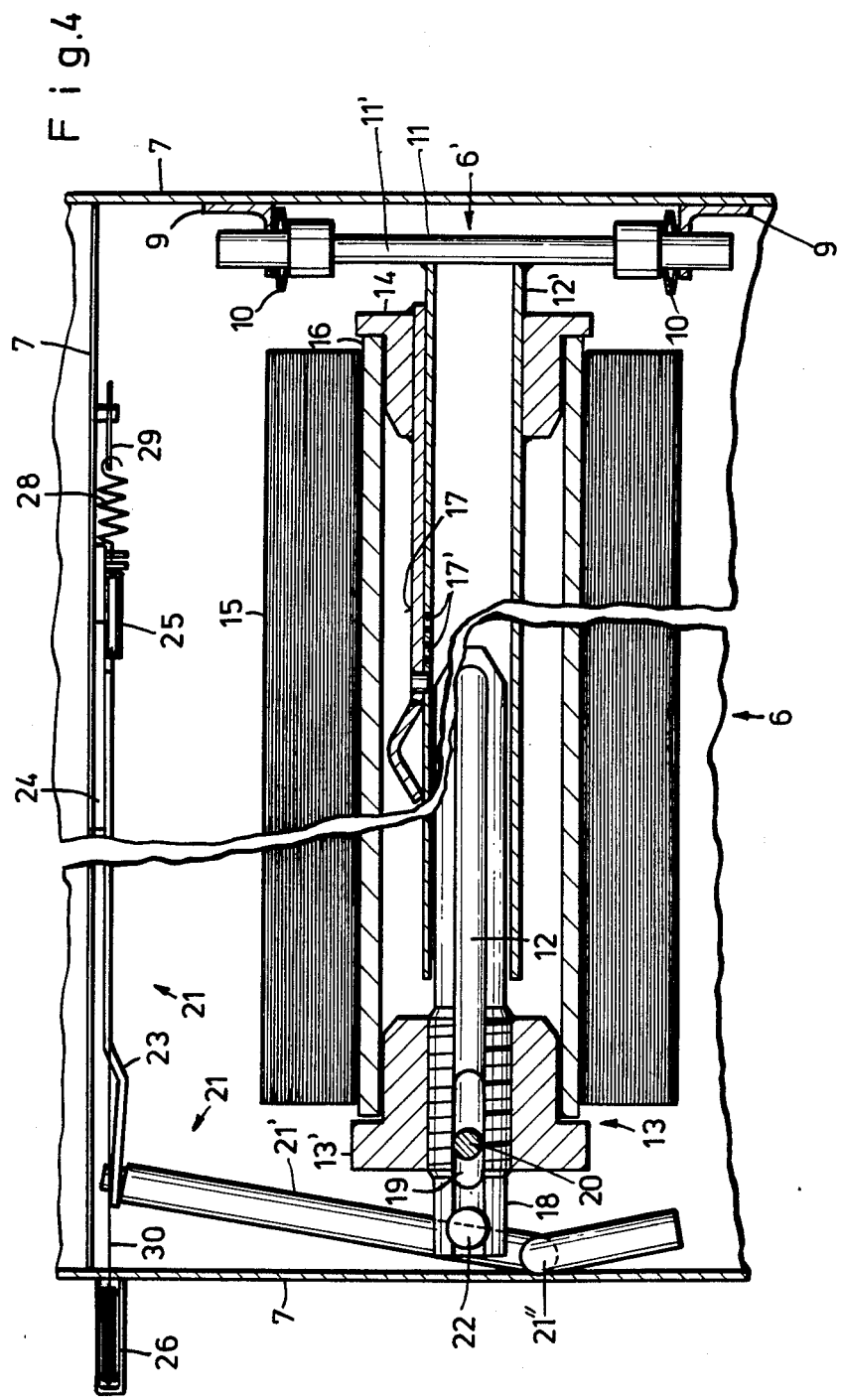

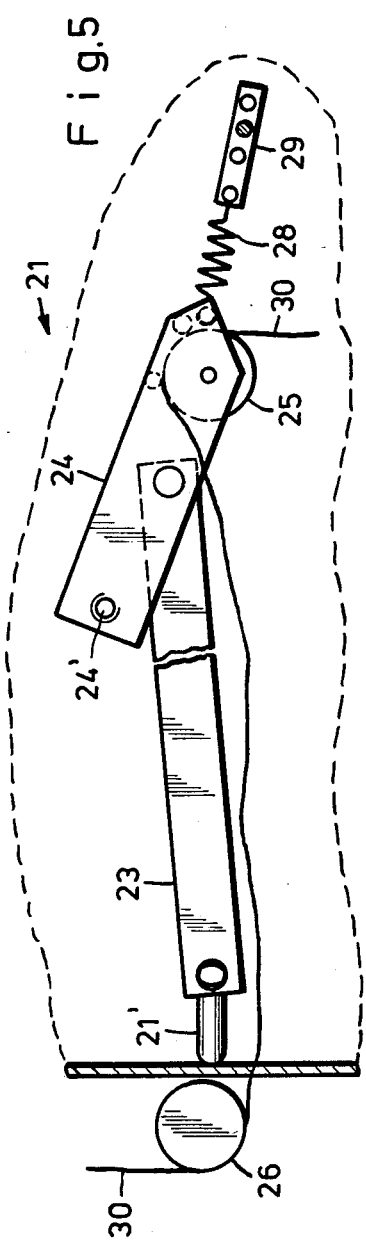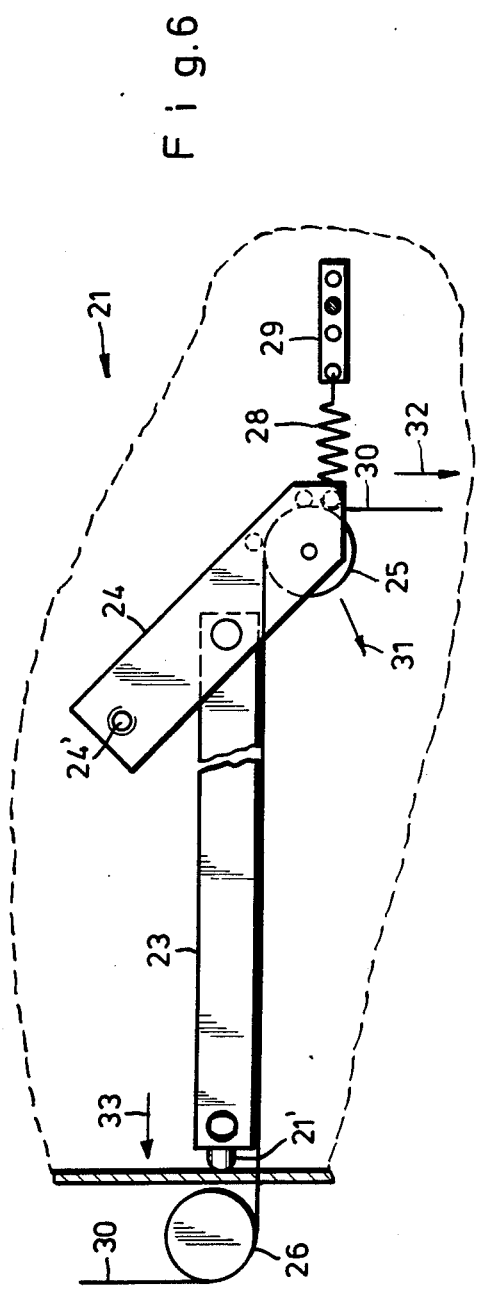

APPARATUS FOR COVERING BALES IN BALING PRESSES

BACKGROUND OF THE INVENTION

The invention refers to an attachable apparatus for covering a round bale of agricultural harvested goods inside of the molding chamber of a baling press with a section of a covering.

In a known apparatus of this kind, the lead end of a covering wound on the supply roll is guided between two parallel drums, which form the pulling-off mechanism, to an entry slit of the molding chamber. Spring devices are provided for safely grabbing and carrying along the covering and which press one of the unwinding drums against the other, and one of the unwinding drums is provided with a drive which can be turned on and off. A constant, fixedly set braking force acts upon the supply roll as soon as the supply roll is set in revolution by pulling off the covering. In this configuration, particularly with a supply roll, the exerted braking effect upon the covering trajectory is proportionally high so that during the starting phase of the covering process, an effective advancing of the covering is not always assured by the unwinding device. Slight damage of the covering results because of slippage of the drive drum. As the supply roll progressively decreases in size, the braking effect on the covering also decreases. However, it also leads to a decrease in tautness with which the round bale wraps itself in the covering.

Accordingly, an object of the present invention is to provide an apparatus which insures a reliable, undamaged feeding of the front end of the covering to the molding chamber during the starting phase of the covering process.

The apparatus according to the invention decreases the braking effect on the covering during the starting phase of the covering process to the extent that the unwinding apparatus can securely seize the lead end of a covering, even of sensitive covering materials, and convey it undamaged to the molding chamber. After completion of the starting phase, a tight wrapping of the round bales in the covering is obtained by a protective braking action on the covering as the latter is unwound. The braking action is controlled in relationship to the weight of the supply roll as a further feature of the invention. Thus the tautness of the wrapping is independent of the degree of fullness of the supply roll. The braking force exerted in relationship to the net weight of the supply roll can be increased so that the tautness of the covering trajectory, into which the round bales are wrapped, can be adjusted in this way.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents.

The construction and operation of the invention, however, together with additional objects and advantages thereof will be best understood from the following description of specific embodiments when read in connection with the accompanying drawings.

BRIEF DESCRIPTION OF THE DRAWINGS

FIG. 2 is a schematic side view partially broken away of a baling press with a covering apparatus according to FIG. 1.

FIG. 3 is a cross-sectional view of a support frame for the supply roll showing the position of the parts of the covering process after the starting phase.

FIG. 4 is a view similar to FIG. 3 showing the position of the parts during the starting phase of the covering process.

FIG. 5 is a schematic top view, partially broken away, of the switching gear showing the position of its parts during the covering process which follows the starting phase.

FIG. 6 is a view similar to FIG. 5 showing the position of the parts of the switchgear during the starting phase of the covering process.

DESCRIPTION OF THE PREFERRED EMBODIMENTS

Figure 1:
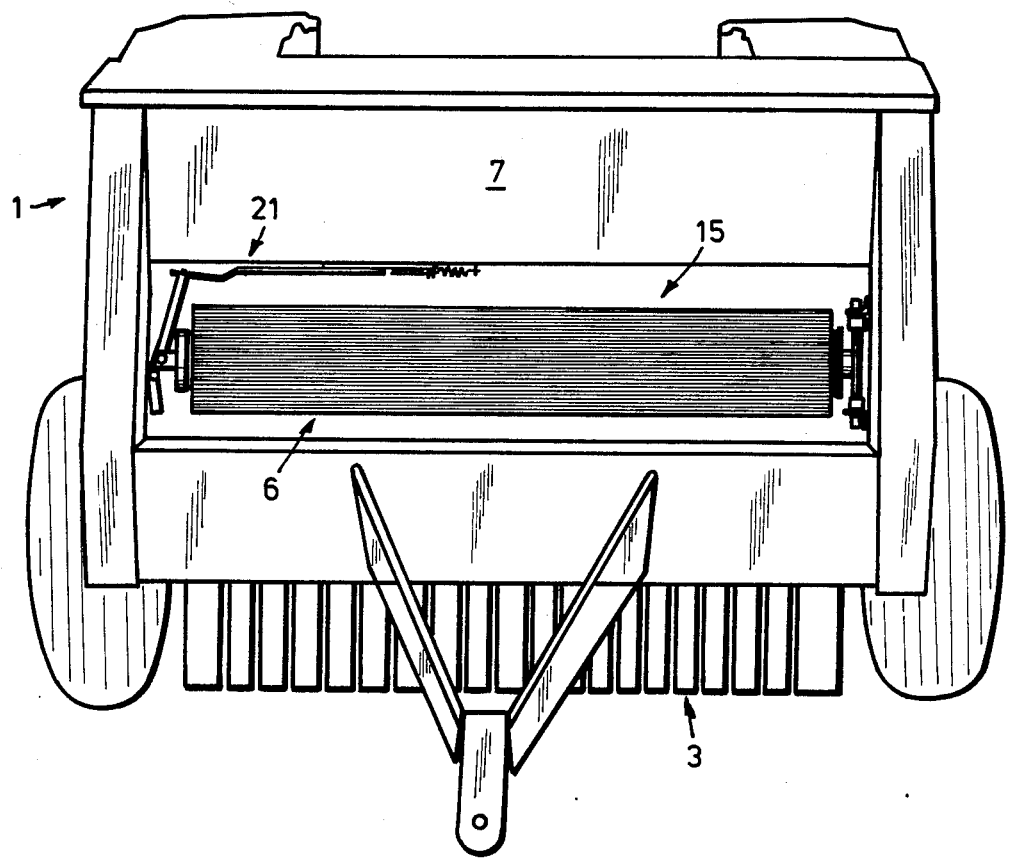
FIG. 1 is a schematic front view of a bale press with a covering apparatus according to one embodiment of the invention.

FIGS. 1 and 2 show an embodiment of the baling press 1 with a molding chamber 2 and a receiving device 3 for the goods to be harvested and which can be adjusted in the direction of the arrow 4 for collecting the harvested goods as well as for forming and compressing the round bales.

Baling presses of this kind are conventionally known. Their specific configuration is not a decisive factor as regards the covering apparatus 6 of the present invention. The apparatus of the present invention is also utilizable for baling presses of different constructions than the one shown.

The covering apparatus 6 consists of a supply roll 15 which is positioned relatively closely above and parallel to an entry opening 8 through which the collected harvested goods enter the molding chamber 2. The covering apparatus 6 forms a building unit which requires minimal engineering efforts and can be installed on the baling presses, or respectively, can be added to them later.

As shown in the enlarged representation of FIGS. 3 and 4, a supply frame 6', including a square support pipe 12' and a therein-insertable square profile section 18, which is positioned coaxially of a transversal axis 12, is provided for the supply roll 15. At the end of these parts are tail pieces 13' and 14 serving as receptable and brake for the core socket or the support roll 16 of the supply roll 15. The tail piece 14 is fastened on the square support pipe 12' by an adjustment plate 17 which provides a connection to the bore holes 17' to provide an approximate adjustment of the tail piece 14 for adapting to the various widths of the support roll 16. The tail piece 13', serving for fine-tuning adjustment, is configured as a nut and is rotatably, as well as arrestably positioned on the male threads of one of the rounded corners of the square profile section 18. The tail piece 13', which forms a part of the braking apparatus 13, is adjusted by varying the angle position of a support lever 21' relative to the perpendicularly directed press housing 7. The support lever 21' is pivotably connected to the square profile 18 which forms a pivotal point of rotation with a take-up pin or bolt 22 and which is furthermore pivotally supported on the press housing by a support pin or bolt 21" forming another pivotal point of rotation. The centers of the take-up bolt 22 and of the support bolt 21" do not lie on a perpendicular or vertical line so that the gravity from the net weight of the supply roll 15 is always applied as a force component in the direction of the transversal axis 12 (in FIGS. 3 and 4, to the left) which effects the braking force of the braking device 13. The weight of the left end of the supply roll 15 (in FIG. 3) is pivotably supported at the bolt 22 which pivotably connects lever 21' and profile section 18. Such weight tends to pivot lever 21' clockwise (FIG. 3) about bolt 21" and such pivoting moves tail piece 13' (which is threaded to profile section 18", to the right (FIG. 3) to apply a braking action against the left longitudinal end of roll 16. Therefore, the greater the weight of the supply roll 15, the greater such braking action.

According to the drawing, the support frame 6' of the illustrated embodiment is supported on the right side of the press housing 7 by a support rod 11 which is fixedly connected to the square support 12'. The support rod 11 is swivellably mounted on the side wall of the press housing 7 in a vertical position between the angle holders 9 and can be slowed down by the spring disks 10. During exchanging of the supply roll 15, fastening of the square support pipe 12' is performed by the braking of the spring disks 10. On the opposite side, the support of the support frame 6' is provided on the press housing 7 by the support lever 21'.

A retention pin 20, which can engage in a longitudinal guide 19, is provided for securing the end piece 13' against undesired rotation on the square profile 18.

For operating the covering apparatus 6 from the location of a tractor, which is not shown, there is provided a rope 30 for operating a pull-off device 5 for the covering. The rope is guided over guide pulleys 25, 26 and the guide pulley 25 is swivelable by being supported on a rocking lever 24 of a switchgear 21. A pull on the rope 30 via the guide pulley 25 causes a swiveling movement of the rocking lever 24 around its pivot 24' in the direction of the arrow 31 and a pushing effect on guide 23 in the direction of the arrow 33, i.e. opposite to the effect of a spring 28. At the same time, by the pull on the rope 30, the pull-off device 5 starts. Due to the pushing effect on the guide 23, which is guided by the rocking lever 24, the support lever 21' which is configured as a toggle lever, is swiveled counterclockwise in FIGS. 3 and 4, causing a reduction, respectively compensation, of the braking force of the braking device 13 by a displacement of the tail piece 13' to the left.

Upon the completion of the pull on the rope 30, when the lead end of the covering has been seized by the round bale formed in the molding chamber 2 of the baling press 1, the switchgear 21 returns again to its initial position (FIG. 5), i.e. by means of the spring 28, and a build-up of the braking force of the braking device 13 takes place. The spring 28, besides the return, also takes care of the reinforcement of the braking force produced by the component of gravity of the supply roll 15. This reinforcement is adjustable by a change of the spring force by means of resetting an adjustment plate 29 so that the tautness of the round bale covering is adjustable.

When a round bale is finished in the molding chamber 2 of the baling press 1, then starting from the initial position illustrated in FIG. 3, the braking force of the brake 13 is considerably lowered, respectively cancelled, by pulling on the rope 30 via the guide pulley 25, the rocking lever 24, the lever 23 and the support lever 21'. A swivel control lever 34 of the pull-off 5 is activated simultaneously with the rope 30. The activation of the swivel control lever 34 causes a drive of an upper pull-off drum 36 to turn on, which causes the lead end of the covering, which is positioned between the upper pull-off drum 36 and a lower pull-off drum 35, to advance in the direction of the opening where the goods are entered. As soon as the lead end of the covering is caught by the round bale, which is located in the molding chamber 2, the operator can return the switchgear 21 into its initial position by letting go of the rope 30. This causes again a build-up of the braking force of the braking device 13, which is dependent on the weight of the supply roll 15. Because the covering is being pulled off from the supply roll 15, the diameter of the supply roll 15 which constitutes the characteristic magnitude of the pull-off momentum as well as the weight of the supply roll 15 which determines the braking force, decrease almost proportionally to each other. The approximated proportion results in a practically evenly tensioned covering of the round bales. The covering process is completed by cutting the covering on a point of the trajectory direction lying behind the pull-off device 5. The working process and the control of the pull-off and the cutting devices, as well as other pertinent details concerning the covering apparatus can be found in Federal Republic of Germany No. DE-C-33 22 024 which is incorporated by reference.

After completion of the covering process, the covering apparatus 6 is automatically readied for further processing.

When the covering apparatus 6 has to be supplied with a new supply roll 15, after removal of a take-up bolt 22, which is secured by a spring plug, or the like, the supply frame 6' can be swung around the rotational axis 11' and maintains this position due to the braking effect of the spring disk 10 so that a simple changing of the supply roll 15 is made possible.

The limited motion in altitude of the left end of the support construction for the supply roll 15, (see FIG. 3) in practical applications, results from a certain flexibility of the right wall 7 of the presshousing and/or a certain play of the support rod 11 in the angle holders 9 and/or from a general elasticity of the materials of all the parts of the support construction. Theoretically, the motion in altitude, however, can also be brought about by the spring disks 10. Practically, however, this is not the case, because the motion in altitude amounts only to a few millimeters, and such a small motion in altitude does not require any special measures. Therefore, a special pivot is not provided.

What we claim is:

1. Apparatus for a baling machine for covering a bale of harvested goods contained in a forming chamber of a baling press, comprising a housing, a supply roll means rotatable in said housing and on which a supply roll of covering material is disposed, housing support means on one longitudinal end of said supply roll means for supporting said supply roll means from said housing so as to provide for vertical displacement of the other longitudinal end of said supply roll means, support means rotatably supporting said other longitudinal end of said supply roll means, said support means comprising a pivotal lever pivotably supported on said housing, connection means pivotably connecting said pivotal lever to said other end of said supply roll means such that the weight of said supply roll means tends to pivot said pivotal lever in one direction, said support means further comprising a braking means operated by said pivotal lever for applying a braking force to said supply roll means when said pivotal lever is pivoted in said one direction, whereby the magnitude of the braking force applied by said brake means is continuously proportional to the weight of said supply roll means.

2. Apparatus according to claim 1, wherein said supply roll means has an elongated cylindrical core on which said covering material is disposed, said braking means having a braking element which is moved in a direction generally parallel to the longitudinal axis of said cylindrical core when said braking force is applied to thereby apply said braking force against one longitudinal end of said cylindrical core.

3. Apparatus according to claim 1, wherein said housing support means supports said supply roll means in cantilever fashion from said housing.

4. Apparatus according to claim 1 further comprising actuating means operably connected to said pivotal lever to pivot the pivotal lever in an opposite direction such that the amount of the weight of the supply roll means applied to said braking means is reduced or cancelled.

5. Apparatus according to claim 1, wherein said housing support means comprises pivotal means for pivotally supporting said supply roll means for pivotal movement about a generally vertical axis to provide for replacing a roll of covering material on said supply roll means.

6. Apparatus according to claim 1, wherein said supply roll means comprises an elongated cylindrical core which is hollow, said braking means comprising a braking element having an axial portion axially slideable into a longitudinal end of said core and a flange portion which is adapted to abut the longitudinal end of said core to effect said braking action.

7. Apparatus according to claim 6, wherein said support means further comprises an elongated part on which said braking element is threaded, first pivotal means pivotably connecting said elongated part to said pivotal lever, and second pivotal means pivotably connecting said pivotal lever to said support housing.

8. Apparatus according to claim 16, wherein said braking element rotatably supports one longitudinal end of said core, said second pivotal means being horizontally spaced from said first pivotal means such that the weight of said supply roll means is transmitted through said braking element to said pivotal lever tending to pivot said pivotal lever in said one direction in a manner to apply a horizontal and axial force component to said braking element so that said flange portion of said braking element applies a braking action against the longitudinal end of said supply roll means.

9. Apparatus according to claim 6, wherein said supply roll means further comprises a hollow member mounted on said housing by said housing support means, and a tail piece mounting said core on said hollow member.

10. Apparatus for a baling machine for covering a bale of harvested goods contained in a forming chamber of a baling press, comprising a housing, a supply roll means rotatable in said housing and on which a supply roll of covering material is disposed, housing support means on one longitudinal end of said supply roll means for supporting said supply roll means from said housing so as to provide for vertical displacement of the other longitudinal end of said supply roll means, support means rotatably supporting said other longitudinal end of said supply roll means, said support means comprising a pivotal lever, pivotal lever support means pivotably supporting said pivotal lever on said housing, connection means pivotably connecting said pivotal lever to said other end of said supply roll means, said support means further comprising braking means carried by said pivotal lever for applying a braking force to said supply roll means when said pivotal lever is pivoted in one direction, whereby the magnitude of the braking force applied by said brake means is continuously proportional to the weight of said supply roll means, and actuating means manually actuable and operable connected to said pivotal lever to pivot said pivotal lever in an opposite direction to thereby reduce or cancel said braking force.

11. Apparatus for a baling machine for covering a bale of harvested goods contained in a forming chamber of a baling press, comprising a housing, a supply roll means rotatable in said housing and on which a supply roll of covering material is disposed, housing support means on one longitudinal end of said supply roll means for supporting said supply roll means from said housing so as to provide for vertical displacement of the other, longitudinal end of said supply roll means, support means rotatably supporting said other longitudinal end of said supply roll means, said support means comprising a pivotal lever, pivotal lever support means pivotably supporting said pivotal lever on said housing, connection means pivotably connecting said pivotal lever to said other end of said supply roll means such that the weight of said supply roll means tends to pivot said pivotal lever in one direction about said pivotable lever support means, actuating means operable to pivot said pivotal lever in a direction opposite to said one direction, said support means further comprising a braking means operated by said pivotal lever for applying a braking force to said supply roll means when said pivotal lever is pivoted in said one direction such that the magnitude of the braking force applied by said braking means is continuously proportional to the weight of said supply roll means, said actuating means being manually actuable to reduce or cancel said braking force.

12. Apparatus according to claim 11, wherein said baling press has a housing and a forming chamber, said supply roll means extending across the width of the housing and being disposed on a tranversal axis parallel to the axis of the forming chamber, said baling press having a pull-off device for feeding the lead end of the covering material to the forming chamber during the starting of the covering of the bale.

13. Apparatus according to claim 12 wherein actuating means is operably coupled to said pull-off device such that said actuating means is operable to initiate starting of the pull-off device and to simultaneously release the extent of the braking action applied by said braking means.

14. Apparatus according to claim 13, wherein said actuating means actuated by an operator to release the braking force of said braking means.

15. Apparatus according to claim 14, wherein said actuating means comprises a biasing means providing a biasing force to said braking means.

16. Apparatus according to claim 15 further comprising adjustable mounting means for adjustable mounting said biasing means to adjust the amount of biasing force applied to said braking means.

17. Apparatus according to claim 14, wherein said actuating means comprises a rope operating along guide pulley means for reducing or cancelling the braking force applied by said braking means.

* * * * *